(12) United States Patent
Buch et al.

(10) Patent No.: US 12,514,436 B2
(45) Date of Patent: Jan. 6, 2026

(54) ENDOSCOPE HANDLE WITH FRAME

(71) Applicant: AMBU A/S, Ballerup (DK)

(72) Inventors: Ken Henrik Buch, Vordingbord (DK);
Peter Bender Christoffersen, Kgs.
Lyngby (DK); Frederik Clausager
Vemb Hansen, Copenhagen NV (DK);
Jonas Hjortlund, Copenhagen S (DK);
Charlotte Krag Varslev-Pedersen,
Ballerup (DK)

(73) Assignee: AMBU A/S, Ballerup (DK)

( * ) Notice: Subject to any disclaimer, the term of this patent is extended or adjusted under 35 U.S.C. 154(b) by 428 days.

(21) Appl. No.: 18/072,188

(22) Filed: Nov. 30, 2022

(65) Prior Publication Data

US 2023/0085800 A1 Mar. 23, 2023
US 2025/0151990 A2 May 15, 2025

(30) Foreign Application Priority Data

Dec. 1, 2021 (EP) ..................................... 21211782

(51) Int. Cl.
A61B 1/005 (2006.01)
A61B 1/00 (2006.01)
(52) U.S. Cl.
CPC ........ *A61B 1/0052* (2013.01); *A61B 1/00045* (2013.01); *A61B 1/0011* (2013.01); *A61B 1/00128* (2013.01); *A61B 1/0057* (2013.01)
(58) Field of Classification Search
CPC . A61B 1/0052; A61B 1/00128; A61B 1/0057; A61B 1/00066; A61B 1/00105
See application file for complete search history.

(56) References Cited

U.S. PATENT DOCUMENTS 4,552,129 A 11/1985 Utsugi et al.
5,169,568 A 12/1992 Ainger, III
(Continued)

FOREIGN PATENT DOCUMENTS

DE 3206381 A1 9/1983
DE 4000410 A1 7/1991
(Continued)

OTHER PUBLICATIONS

Extended search report in European Patent Application No. 21211782. 4, dated May 10, 2022, 8 pages.
(Continued)

*Primary Examiner* — Anh T Nguyen
*Assistant Examiner* — Rynae E Boler
(74) *Attorney, Agent, or Firm* — Faegre Drinker Biddle & Reath LLP

(57) ABSTRACT

An endoscope having a handle, the handle including a frame with bearings, a control device with trunnions extending from opposite sides of a body of the control device, shell parts together enclosing a cavity accommodating the frame and at least partly the control device therein, the shell parts including a first column and a second column extending into the cavity from opposite sides, wherein the shell parts and the frame each are formed as separate components, wherein the trunnions of the control device and preferably the columns are supported by the bearings of the frame so that the control device is rotatable about a pivot axis, and wherein the first and second columns of the shell parts are arranged to retain the trunnions of the control device between the first and second columns of the shell parts.

21 Claims, 7 Drawing Sheets

(56) References Cited

U.S. PATENT DOCUMENTS

| | | | |
|---|---|---|---|
| 5,347,993 | A | 9/1994 | Tanaka |
| 6,527,707 | B1 | 3/2003 | Frische et al. |
| 10,335,020 | B2 | 7/2019 | Oskin |
| 10,624,617 | B2 | 4/2020 | Matthison-Hansen et al. |
| 10,631,716 | B2 | 4/2020 | Matthison-Hansen |
| 10,645,260 | B2 | 5/2020 | Matthison-Hansen et al. |
| 10,646,107 | B2 | 5/2020 | Matthison-Hansen et al. |
| 10,965,844 | B2 | 3/2021 | Matthison-Hansen et al. |
| 11,622,674 | B2 | 4/2023 | Jensen |
| 11,678,793 | B2 | 6/2023 | Hansen et al. |
| 11,992,181 | B2 | 5/2024 | Qvist et al. |
| 2006/0149127 | A1* | 7/2006 | Seddiqui ............... A61B 1/0052 600/104 |
| 2007/0282167 | A1* | 12/2007 | Barenboym ......... A61B 1/0052 600/131 |
| 2011/0218400 | A1* | 9/2011 | Ma ......................... A61B 1/045 600/109 |
| 2014/0336532 | A1* | 11/2014 | Seguy ................... A61B 1/008 606/130 |
| 2016/0367112 | A1 | 12/2016 | Koyama |
| 2017/0065152 | A1 | 3/2017 | Koyama |
| 2018/0153381 | A1 | 6/2018 | Wei et al. |
| 2018/0153389 | A1* | 6/2018 | Dixon ................... A61B 1/267 |
| 2018/0296068 | A1 | 10/2018 | Matthison-Hansen et al. |
| 2018/0303317 | A1* | 10/2018 | Matthison-Hansen ..................... A61B 1/018 |
| 2019/0350440 | A1 | 11/2019 | Leong et al. |
| 2020/0054194 | A1 | 2/2020 | Melsheimer |
| 2020/0196843 | A1 | 6/2020 | Tah et al. |
| 2020/0337529 | A1 | 10/2020 | Chu et al. |
| 2021/0137355 | A1 | 5/2021 | Lund et al. |
| 2021/0203813 | A1 | 7/2021 | Matthison-Hansen et al. |
| 2023/0085800 | A1 | 3/2023 | Buch et al. |
| 2023/0157519 | A1 | 5/2023 | Lund et al. |
| 2023/0165442 | A1 | 6/2023 | Buch et al. |
| 2023/0165444 | A1 | 6/2023 | Schütz et al. |
| 2023/0233063 | A1 | 7/2023 | Matthison-Hansen et al. |

FOREIGN PATENT DOCUMENTS

| | | | |
|---|---|---|---|
| WO | WO-2018162556 A1 * | 9/2018 | ........... A61B 1/0052 |
| WO | 2020123588 A1 | 6/2020 | |
| WO | 2021213598 A1 | 10/2021 | |

OTHER PUBLICATIONS

Intention to grant in European Patent Application No. 21211782.4, dated Sep. 13, 2024, 7 pages.

Extended search report in European Patent Application No. 21211783.2 (1219), dated May 10, 2022, 8 pages.

\* cited by examiner

ENDOSCOPE HANDLE WITH FRAME

CROSS-REFERENCE TO RELATED APPLICATIONS

This application claims priority from and the benefit of European Patent Application No. EP 2121 1782, filed Dec. 1, 2021, said application incorporated by reference herein in its entirety.

TECHNICAL FIELD

The present disclosure relates to an endoscope handle comprising a control device with trunnions supported by shell parts of the endoscope handle and a method for assembling such an endoscope handle.

BACKGROUND

Insertion endoscopes are well-known devices in the medical field for visually examining the interior of a hollow organ or cavity of a body, such as lungs or a bladder or intestines, by means of inserting an insertion cord of the endoscope. The insertion cord of the endoscope comprises an elongated insertion tube, a distal tip part, and a bending section connecting the insertion tube with the distal tip part. The endoscope typically has a handle connected to the insertion tube and positioned at the proximal end as seen from the operator. The endoscope further has a vision device, such as a built-in camera or fibre optics. The vision device is typically incorporated in the distal tip part at the distal end of the endoscope. This definition of proximal as being closest to an operator and distal as being furthest from an operator is used throughout this disclosure. Illumination of the area in front of the distal tip part of the endoscope is normally required, in particular in the field of vision of the vision device. One known way of achieving such illumination is to incorporate one or more Light-Emitting Diodes (LEDs) in the distal tip part of the endoscope. Alternatively, illumination may be provided by light guides and/or fibre optics for guiding light from a light source outside the endoscope and to the distal tip part.

The bending section is provided in order to manoeuvre the endoscope inside the body cavity. The bending section has increased flexibility, e.g. achieved by a number of articulated segments of which the distal tip part forms the distalmost segment. Bending or straightening of the bending section in the insertion part of the endoscope is typically done by tensioning or slacking, respectively, steering wires running from the distal tip part through the remainder of articulated segments and along the inside of the elongated insertion tube to a control device, such as a control lever, of the endoscope handle.

Data and/or power cables for the vision device (when comprising a camera or image sensor) and other electronics, such as LED lighting accommodated in the distal tip part, also run along the inside of the elongated insertion tube and the bending section from the endoscope handle to the distal tip part. Furthermore, a working channel may run along the inside of the insertion tube and the bending section from the handle to the distal tip part, e.g. allowing liquid to be removed from the body cavity or allowing the insertion of medical tools or surgical instruments into the body cavity.

A main function of the endoscope handle is to allow precise manoeuvring of the distal tip part. Therefore, it is advantageous that the control of the steering wires can be tested and validated before being accommodated within shell parts of the endoscope handle.

Furthermore, the experience from an operator's point of view of manoeuvring of the distal tip part is sensitive to the alignment between the control device and the shell parts. In practice, manufactured parts are subject to tolerances and do not necessarily fit perfectly. For example, when the control device comprises a body accommodated within the shell parts and a control lever extending through a cut out of the shell parts, a misalignment of the body may cause the control lever to drag along a side of the cut out causing unnecessary friction. Furthermore, tighter tolerances increase manufacturing costs.

SUMMARY

On this background, it may be seen as an object of the present disclosure to provide an endoscope handle allowing testing of the performance of one or more steering wires attached thereto prior to the complete assembly. Another object of the present disclosure is to provide an endoscope handle with a reduced tendency to misalignment of the control device relative to shell parts of the endoscope handle. Yet another object of the present disclosure is to provide an endoscope handle that can be manufactured to looser tolerances while maintaining a good alignment of the control device.

One or more of these objects may be met by aspects of the present disclosure as described in the following.

A first aspect of this disclosure relates to an endoscope handle for an endoscope for visually inspecting inaccessible places, such as human body cavities, the endoscope handle comprising:
  a frame comprising bearings;
  a control device comprising a body and trunnions, the trunnions extending from opposite sides of the body along a pivot axis, the control device being configured for steering a distal end of the endoscope by pivoting about the pivot axis; and
  a first shell part and a second shell part together enclosing a cavity accommodating the frame and at least partly the control device therein, the shell parts forming an exterior surface shaped to form an ergonomic grip for an operator, and the shell parts comprising a first column extending along a first column axis and a second column extending along a second column axis, the first and second columns extending into the cavity from opposite sides, wherein the shell parts and the frame each are formed as separate components;
  wherein the trunnions of the control device, and preferably the columns, are supported by the bearings of the frame so that the control device is rotatable about the pivot axis, wherein the first and second columns of the shell parts are arranged to retain the trunnions of the control device between the first and second columns of the shell parts.

Ideally, the shell parts match exactly (thus ensuring that the first and second column axes coincide). However, in practice, the parts of the handle are subject to manufacturing and assembly tolerances. Therefore, the dimensions of the handle components will vary. This may, in some cases, cause a slight misalignment between the shell parts and thus result in the column axes not coinciding exactly. Such misalignment may tip a plane of rotation of the control device relative to the shell parts and result in undesirable increased friction when operating the control device.

The inventors have found that retaining the trunnions of the control device between the columns of the shell parts may advantageously reduce or even eliminate said tip of the plane or rotation of the control device relative to the shell parts. Accordingly, pivoting the control device may be subject to lower friction. This may be especially advantageous when the endoscope comprises a working channel for tool insertions, as such inserted tools typically significantly increase the required torque for steering the distal tip of the endoscope.

Additionally or alternatively, the frame and the bearings may be formed as single component, preferably formed in a single piece of a polymer material. Preferably the polymer material allows adhesion by an adhesive. Preferably and adhesive curable by ultraviolet light, and the polymer material may preferably be transparent to ultraviolet light. One preferred polymer material is methyl methacrylate acrylonitrile butadiene styrene (MABS).

Additionally or alternatively, the frame may be formed by an injection moulding process. Preferably, the frame is a monolithic component that may be formed by a single shot injection moulding process. The frame could also be formed in a multi-shot injection moulding process, such as a two-component injection moulding process.

Additionally or alternatively, the control device may be formed as a single monolithic component, preferably by injection moulding.

Additionally or alternatively, the first and second columns of the shell parts may clamp the trunnions of the control device between the columns of the shell parts.

In practice, the components of the handle are subject to manufacturing and assembly tolerances. Therefore, some manufactured components may exhibit undesirable clearances that may cause unwanted sounds, such as rattling, during use. Although typically not the case, such undesirable sounds may be interpreted as the presence of faults. However, by arranging the columns of the shell parts to clamp the trunnions there in-between, such undesirable clearances between the handle components may be significantly reduced to avoid such unwanted sounds.

Additionally or alternatively, each trunnion may extend partly through the respective bearing and may mate with the respective column within the respective bearing.

Additionally or alternatively, wherein the trunnions of the control device may be securely held in the bearings of the frame.

Such an arrangement may provide for a particularly easy assembly process, which allows further assembly to be performed on the frame without risking separation of the control device and the frame.

Additionally or alternatively, the frame may comprise a first arm and a second arm extending substantially in parallel. The first arm may comprise a first bearing of the bearings, and the second arm may comprise a second bearing of the bearings. During arrangement of the trunnions in the bearings, the arms may be configured to flex away from each other to allow arrangement of the trunnions in the bearings, and may be configured to return to a resting position once the trunnions of the control device are arranged in bearings so as to secure the trunnions in the bearings.

Such an arrangement may further ease the assembly of the control device and the frame, as the assembly does not require any tools to secure the trunnions in the bearings. In addition, any misalignment of the control device relative to the shell parts that might be introduced by the flexibility of the arms may advantageously be mitigated by the retainment of the trunnions by the columns of the shell parts.

Additionally or alternatively, the frame may comprise guides for the trunnions, preferably guide ramps, that may lead to the bearings, respectively. A distance between entries of the guides may be greater than an axial distance between ends of the trunnions so that the trunnions of the control device can be inserted into the guides transversely, preferably perpendicularly, to the pivot axis.

Additionally or alternatively, the shell parts may comprise one or more alignment pairs that each may include a first alignment part of one of the shell parts and a corresponding second alignment part of another of the shell parts. The one or more of alignment pairs may be engaged so as to centre or align the columns with respect to each other. In other words, the alignment pairs may urge the column axes towards coinciding.

By providing the endoscope handle with such alignment pairs, any misalignment of column axes may be reduced or even in some cases eliminated.

Additionally or alternatively, the one or more alignment pairs may number three or more.

Additionally or alternatively, the control device may comprise a control lever that may extend radially relative to the pivot axis through a cut-out of the shell parts. The control lever may have an exterior friction-inducing surface for securely engaging with a finger of an operator so as to allow the operator to pivot the control device about the pivot axis.

Additionally or alternatively, the shell parts may comprise a first collar that may surround the first column and may comprise a second collar that may surround the second column. The collars may retain the bearings of the frame.

Additionally or alternatively, the first shell part may comprise the first column, and the second shell part may comprise the second column.

Additionally or alternatively, a separation line between the first shell part and the second shell part may extend in a single plane that may be substantially perpendicular to the column axes.

By providing the endoscope handle in this way, the assembly of the same may be improved, as the shell parts can be joined along the column axes which aids in applying pressure to the trunnions via the columns.

Additionally or alternatively, the frame may comprise one or more first engagement portions that each may interlock with a corresponding second engagement portion of the shell parts.

Additionally or alternatively, the shell parts may comprise one or more snap lock pairs that each may include a male part of one of the shell parts and a corresponding female part of another one of the shell parts. The male snap lock parts may be snap-locked onto the corresponding female snap lock parts to secure the shell parts to each other so as to preferably clamp the trunnions of the control device between the columns of the shell parts, and so as to preferably fix the one or more first engagement portions of the frame within the corresponding second engagement portions of the shell parts, which may thereby fix the frame relative to the shell parts.

Additionally or alternatively, all the male parts may be arranged on one of the shell parts, and all of the female parts may be arranged on the other shell part.

Additionally or alternatively, the one or more snap lock pairs may number at least three, four, five, six, seven, eight, nine or ten.

A second aspect of the present disclosure relates to an endoscope for visually inspecting inaccessible places, the endoscope comprising:
- the endoscope handle according to the first aspect of the present disclosure, the endoscope handle being attached to the insertion tube opposite of the bending section;
- a distal tip part including:
  - preferably an exterior housing including a circumferentially extending side wall with a proximal opening, the circumferentially extending side wall defining an interior cavity,
  - a vision device, such as an image sensor or fibre optics, positioned in an interior cavity of the distal tip part preferably the interior cavity of the exterior housing;
- a bending section including articulated segments, such as a proximal end segment, a distal end segment, and a number of intermediate segments arranged between the proximal end segment and the distal end segment, wherein the articulated segments are connected via hinges, such as living hinges, wherein the bending section, preferably distal end segment of the bending section, is attached to the distal tip part;
- an insertion tube for insertion into a patient and being attached to the bending section, preferably the proximal end segment of the bending section; and
- at least one steering wire attached to the body of the control device of the endoscope handle and running through the bending section and the insertion tube preferably in one or more wire tubes so that manipulating the control device by an operator tensions the at least one steering wire and effects bending of the bending section so as to steer the distal end tip of the endoscope;

A third aspect of this disclosure relates to an endoscope system for visually inspecting inaccessible places, such as human body cavities, the endoscope system comprising a monitor and an endoscope comprising endoscope handle according to the first aspect of this disclosure or an endoscope according to the second aspect of this disclosure, wherein the endoscope is connectable to the monitor, and the monitor is configured for displaying an image captured by the vision device of the distal tip part.

A fourth aspect of this disclosure relates to a method of assembling an endoscope handle according to the first aspect of this disclosure, comprising the steps of:
- providing:
  - a frame comprising bearings,
  - a control device comprising a body and trunnions, the trunnions extending from opposite sides of the body along a pivot axis, the control device being configured for steering a distal end of the endoscope by pivoting about the pivot axis, and
  - a first shell part and a second shell part configured for enclosing a cavity and configured for forming an exterior surface shaped to form an ergonomic grip for an operator, and the shell parts comprising a first column extending along a first column axis and a second column extending along a second column axis, the first and second columns extend into the cavity from opposite sides;
- arranging the trunnions of the control device and preferably the columns in the bearings of the frame so that the control device is rotatable about the pivot axis;
- arranging the frame with the control device in one of the shell parts; and
- closing the first shell part and the second shell part to enclose the cavity and accommodating the frame and at least partly the control device therein so that the trunnions of the control device are retained between the columns of the shell parts.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

In the following figure description, the same reference numbers refer to the same elements and may thus not be described in relation to all figures. Further, a prime symbol is suffixed for each ordinal element, i.e. a first element is denoted without a prime symbol, a second element of the same type is denoted with a single prime symbol, and a third element of the same type is denoted with two prime symbols and so on.

Figure 1:
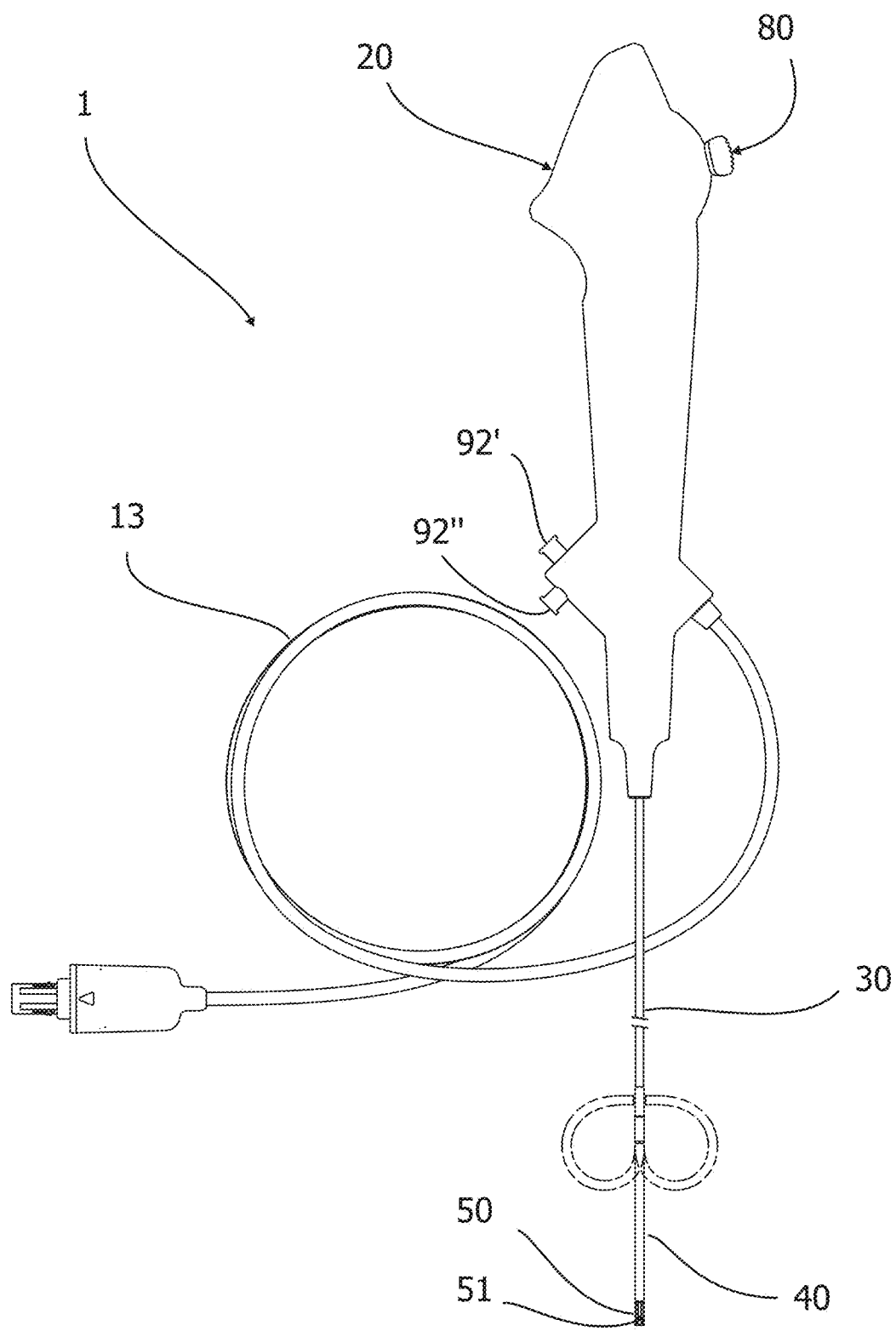
FIG. 1 is a schematics side view of an endoscope illustrating bending of a distal end of the endoscope.
Figure 3:
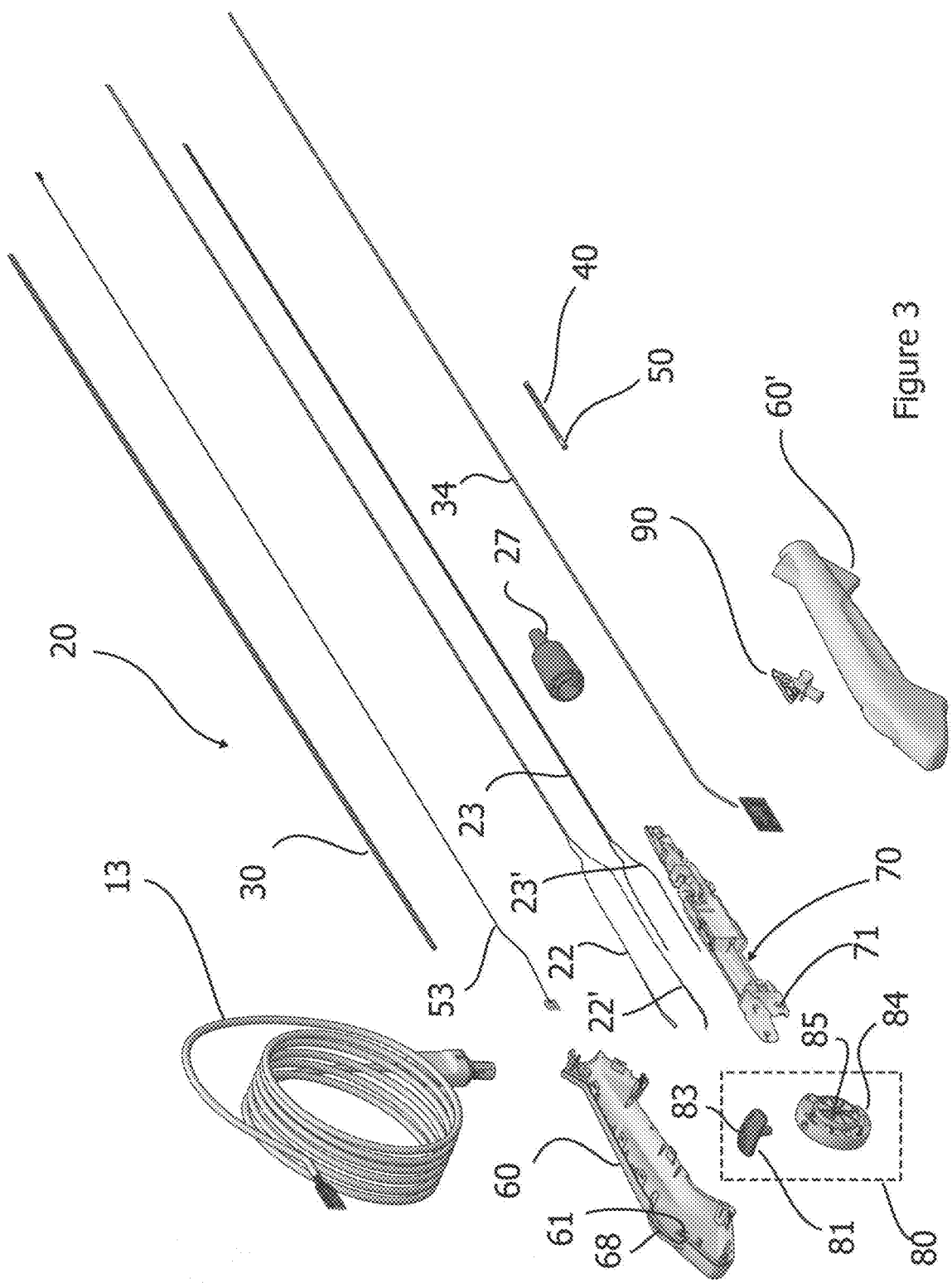
FIG. 3 is schematic exploded view of an endoscope.

FIG. 1 illustrates an endoscope 1, which is disposable and not intended to be cleaned and reused. The endoscope 1 comprises a distal tip part 50 housing a vision device 51, a handle 20 for gripping with a control device 80, an insertion tube 30 for insertion into a patient, and a bending section 40. The bending section 40 comprises articulated segments connected by living hinge members as shown in FIG. 3 and is typically formed in one piece by injection moulding. The bending section 40 is connected between the distal tip part 50 and the insertion tube 30. The insertion tube 30 extends between the handle 20 and the bending section 40. The insertion tube 30 has an exterior tubular surface facing the surroundings of the endoscope 1. The distal tip part 50 includes an image sensor (not shown) positioned in an interior cavity (not shown) of the distal tip part 50.

Figure 2:
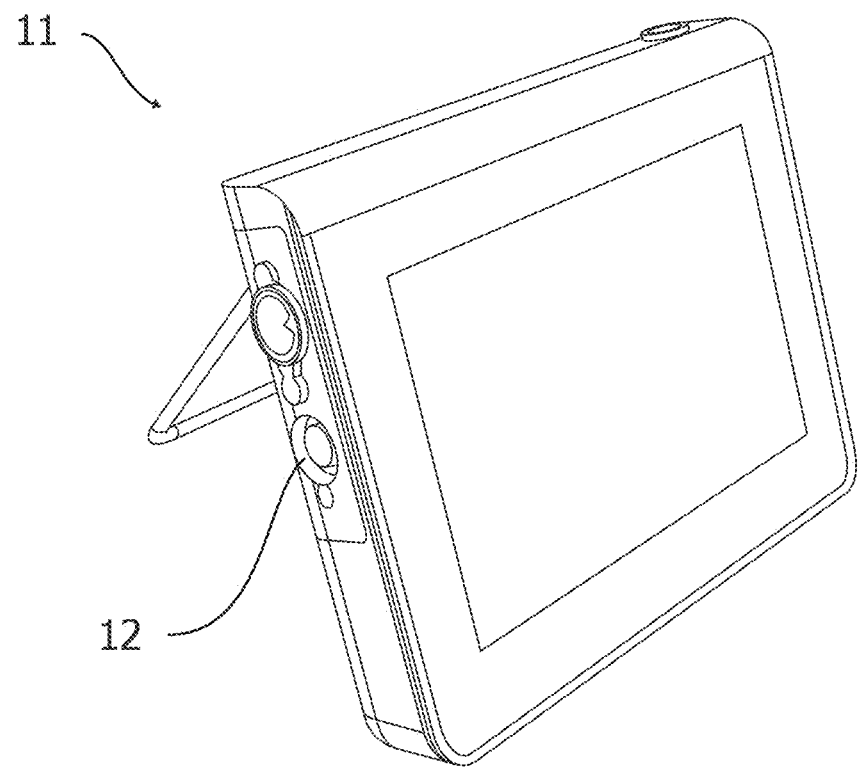
FIG. 2 is a schematic perspective view of a monitor for connecting to the endoscope of FIG. 1.

In FIG. 2, a monitor 11 is shown. The monitor 11 comprises a cable socket 12 to which a monitor cable 13 of the endoscope 1 (shown in FIG. 1) can be connected to establish signal communication between the image sensor of the distal tip part 50 and the monitor 11. The monitor 11 display images and/or video captured by the image sensor of the endoscope 1 thus allowing an operator to "see" the body cavity through the image sensor of the endoscope 1.

Turning to FIG. 3, the components of the endoscope 1 is shown in greater detail in an exploded view. The endoscope handle 20 comprises a first shell part 60, a second shell part 60', a frame 70, and the control device 80. Two steering wires 22, 22' each extend from the control device 80 through a respective wire tube 23, 23' running through the insertion tube 30 and the bending section 40. In one variation, the steering wires 22, 22' are portions of a single wire and are connected to each other by an intermediate portion, or wire loop (not shown), located between the bending section 40 and the distal tip part 50. In another variation, the steering wires 22, 22' are separate wires, each having a distal portion connected to the bending section 40 and/or the distal tip part 50 and a portion accommodated in the wire tube. A working channel extends inside a working channel tube 34 that runs along the inside of the insertion tube 30 and the bending section 40 from fluid openings 92', 92" of a fluid handling device 90 to a distal opening (not shown) in the distal tip part 50. The working channel allows liquid or air to be added to and/or removed from the body cavity or allows for insertion of medical tools or surgical instruments into the body cavity.

Figure 4A:
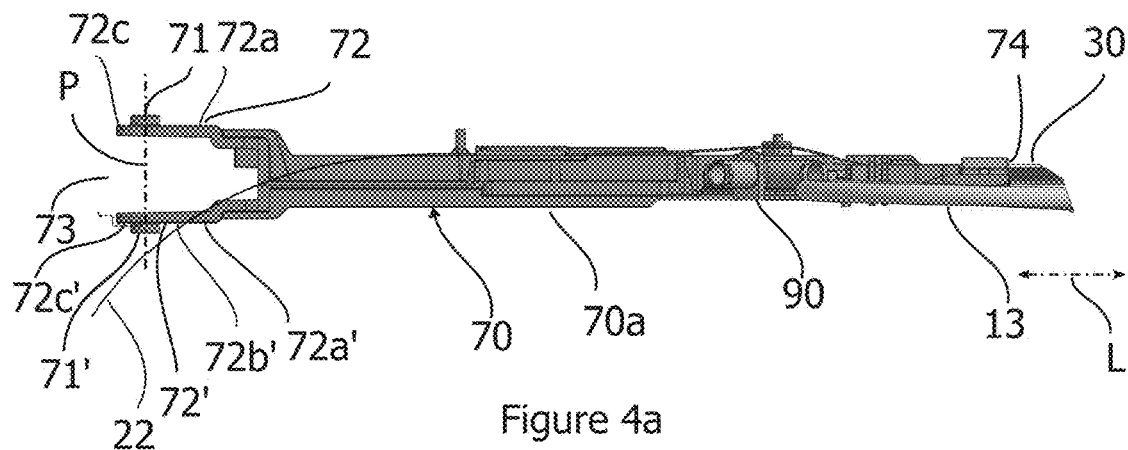
FIG. 4*a* is a top view of a frame of an endoscope handle of the endoscope of FIG. 3.
Figure 4B:
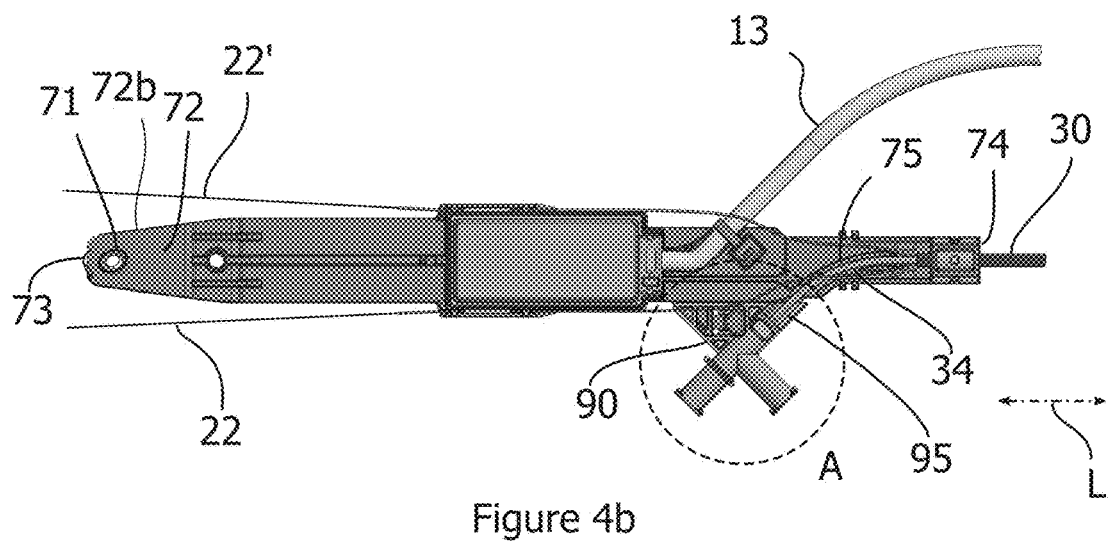
FIG. 4*b* is a side view of the frame of FIG. 4*a*.
Figure 4C:
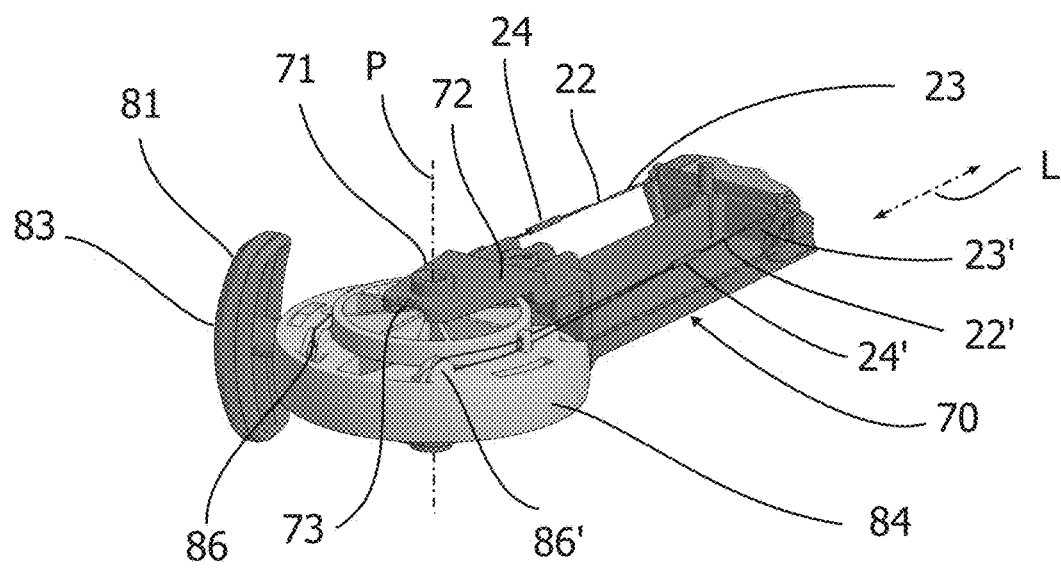
FIG. 4*c* is a schematic perspective view of the frame of FIGS. 4*a* and 4*b* with a mounted control device and steering wires.

Turning to FIGS. 4a-4c, the details of the frame 70, the control device 80, and the fluid handling device 90 are shown.

As best seen in FIGS. 4a-4b, the frame 70 extends along a longitudinal axis L between a proximal longitudinal end 73 and a second longitudinal end 74. The frame 70 comprises a first bearing 71, as shown in FIGS. 4a-4c, and a second bearing 71', as shown in FIG. 4a. The frame 70 and the bearings 71, 71' are formed in a single piece of a polymer material, preferably by injection moulding.

As best seen in FIG. 4c, the control device 80 is arranged at the proximal longitudinal end 73 of the frame and comprises a cylindrical body 84 with trunnions 85, 85' (visible in FIG. 5b and in particular in FIG. 5d), and a control lever 81. The trunnions 85, 85' extend from opposite sides of the body 84 along a pivot axis P. The control lever 81 has an exterior friction-inducing surface 83 for securely engaging with a finger of an operator so as to allow the operator to pivot the control device 80 about the pivot axis P.

As seen in FIG. 4c, the ends of the two steering wires 22, 22' are guided around respective wire loop portions 86, 86' of the body 84 and crimped onto the same steering wire 22, 22' via crimps 24, 24' so as to fix the steering wires 22, 22' to the control device. Since the steering wires run inside wire tubes 23, 23' which are fixed, the control device 80 can thus steer the distal tip part 50 of the endoscope when an operator manipulates the friction-inducing surface 83 of the control lever 81 to pivot the control device 80 about the pivot axis P and thus tension one of the steering wires 22, 22'. This principle may be known as a Bowden cable.

The steering wires 22, 22', the working channel tube 34, the cable 53 run along the inside of the insertion tube 30 which terminates at its proximal end in an end cap 27. The end cap 27 is arranged about the distal longitudinal end 74 of the frame 70.

Figure 5A:
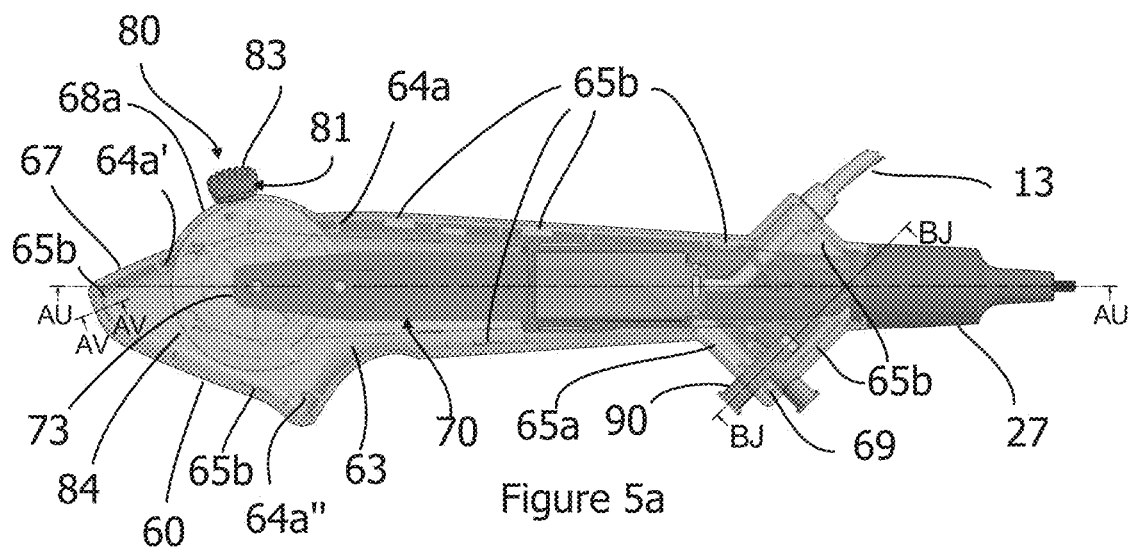
FIG. 5*a* is a schematic side view of an endoscope handle of the endoscope of FIG. 3 shown wherein the second shell part is omitted to show the interior of the endoscope handle.

The frame further comprises a frame body 70a, a first arm 72 having the first bearing 71, and a second arm 72' having the second bearing 71'. The arms 72, 72' extend substantially in parallel. The first arm 72 and the second arm 72' each comprise a distal end 72a, 72a' connected to the frame body 70a, a middle portion 72b, 72b', and a proximal end 72c, 72c' extending proximally from the middle portion 72b, 72b', the proximal end 72c of the first arm including the first bearing 71, the proximal end 72c' of the second arm including the second bearing 71', the frame body 70a being devoid of structure connecting the proximal end and the middle portion of the first arm to the proximal end and the middle portion of the second arm to thereby enable the proximal end of the first arm and the proximal end of the second arm to separate from each other upon application of a spreading force and to return to a resting position upon removal of said spreading force. The arms 72, 72' comprise respective ramps 77, 77' oriented along the longitudinal axis L and leading to the bearings 71, 71' as best seen in FIG. 5d. Further, the arms 72, 72' are configured, when inserting the trunnions 85, 85' in the ramps 77, 77', to flex away from each other to allow insertion of the trunnions 85, 85' in the bearings 71, 71', and to return to a resting position once the trunnions 85, 85' of the control device 80 are arranged in bearings 71, 71' so as to securely hold the trunnions 85, 85' in the bearings 71, 71', and accordingly mount the control device 80 to the frame 70.

Figure 5B:
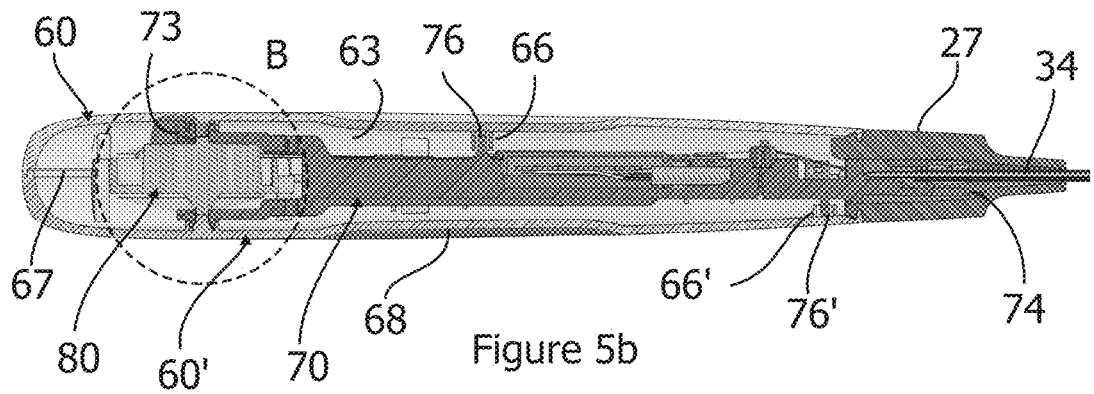
FIG. 5*b* is a cross-sectional view of the endoscope handle along line AU-AU shown in FIG. 5*a*.
Figure 5C:
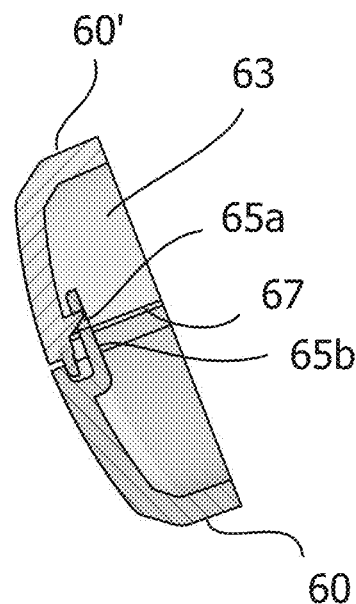
FIG. 5*c* is a cross-sectional view of a snap lock connection of the shell parts along line AV-AV shown in FIG. 5*a*
Figure 5D:
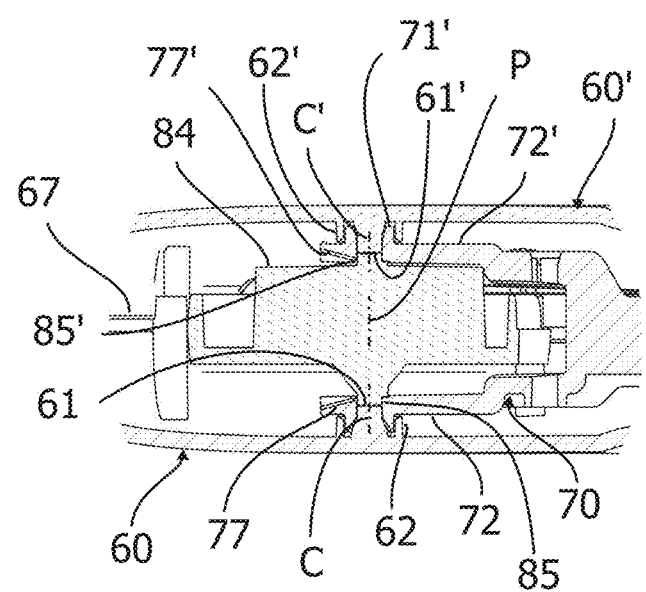
FIG. 5*d* is a detail view of the connection between the shell parts and the control device as indicated by the dashed circle B shown in FIG. 5*b*.

The first shell part 60 comprise a first column 61, see FIGS. 3, 5b, and 5d. The second shell part 60' comprises a second column 61', see FIGS. 5b and 5d. Turning specifically to FIG. 5d, the columns 61, 61' extend along a respective column axis C, C' and into the cavity 63 from opposite sides.

The first shell part 60 comprises three first alignment parts 64a, 64a', 64a", as best seen in FIG. 5a, forming three alignment pairs together with three corresponding second alignment parts (not shown) of the second shell part 60'. The alignment pairs are configured, upon closure of the shell parts, to align the column axes C, C' with respect to each other, and thus the alignment pairs are arranged substantially along the separation line 67 of the shell parts 60, 60' and circumscribe the body 84 of the control device 80, as indicated by the first alignment parts 64a, 64a', 64a" in FIG. 5a.

Figure 6A:
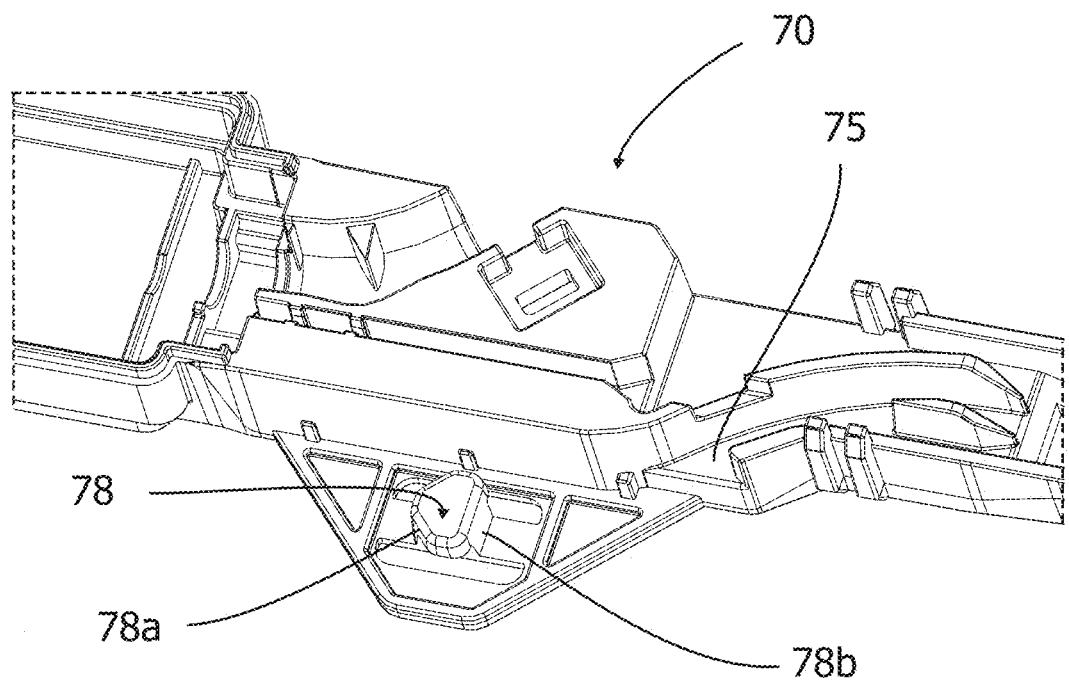
FIG. 6*a* is a detail view at the location of the pin of the frame.
Figure 6B:
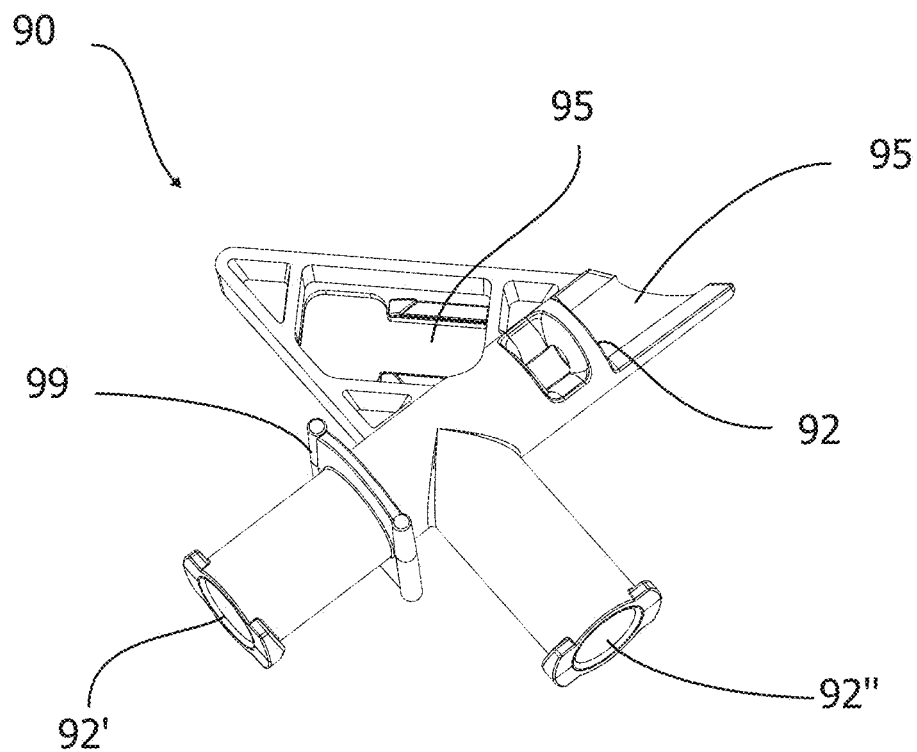
FIG. 6*b* is a perspective view of the fluid handling device.
Figure 7A:
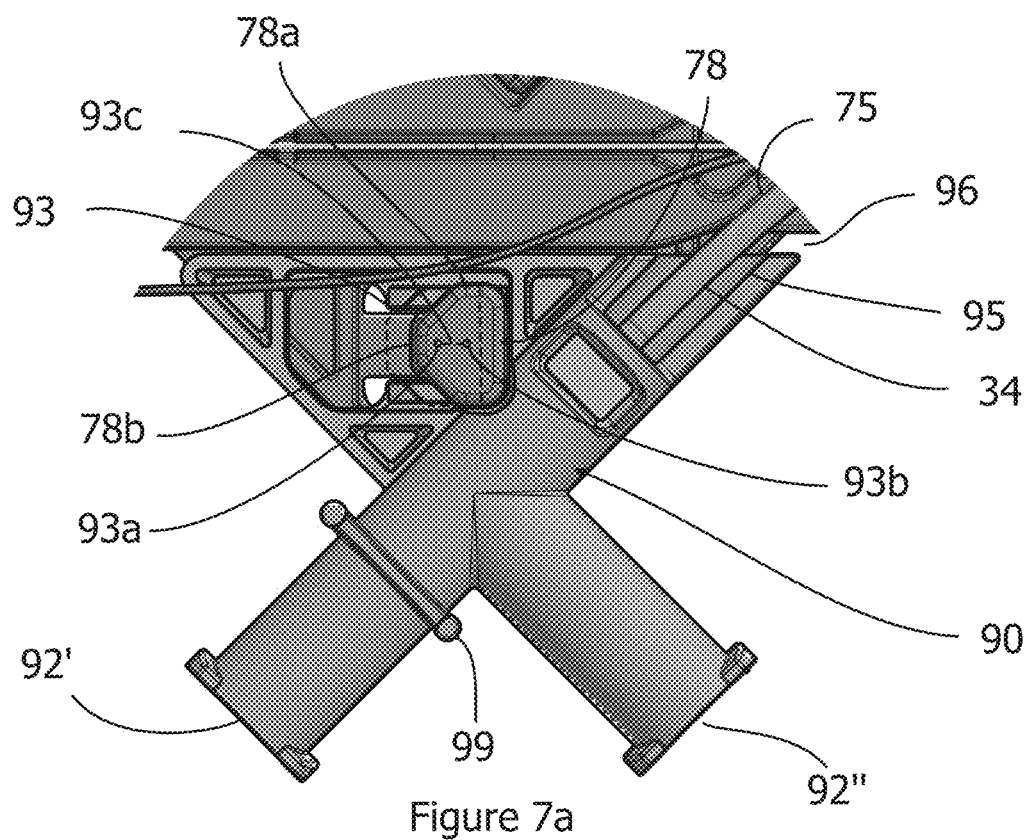
FIG. 7*a* is a detail view of connection between the fluid handling device and the frame as indicated by the dashed circle A shown in FIG. 4*b*.
Figure 7B:
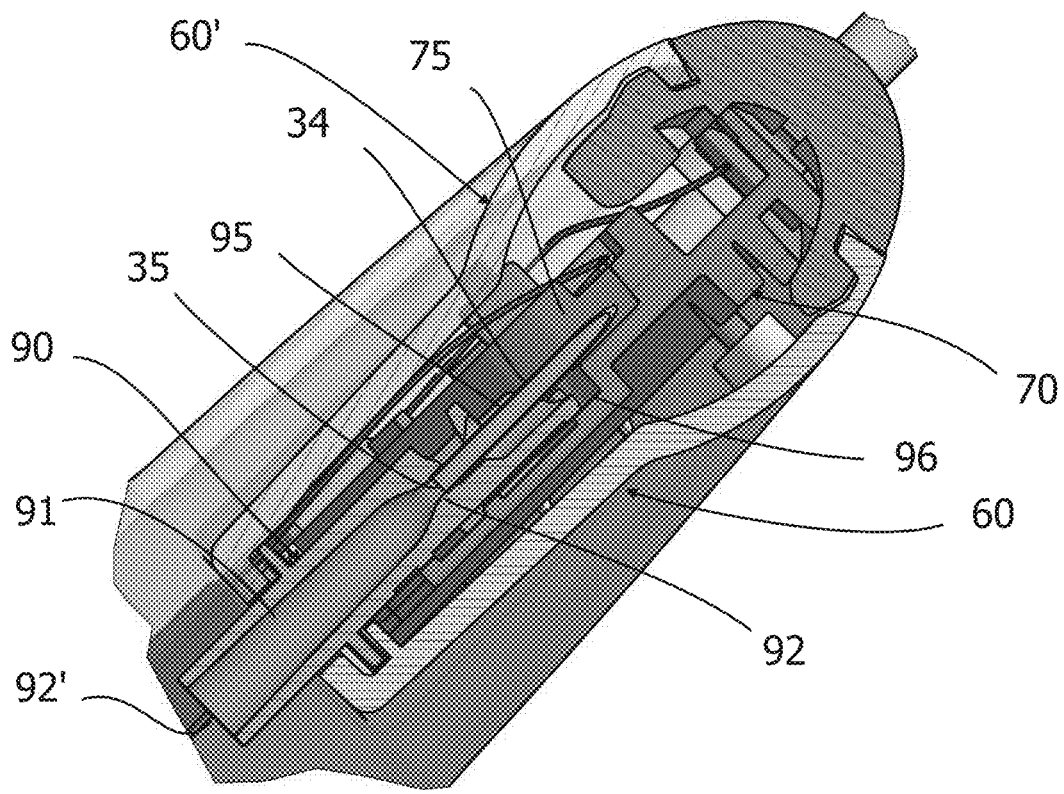
FIG. 7*b* is a cross-sectional view of the connection between the fluid handling device and the tube along line BJ-BJ shown in FIG. 5*a*.

The endoscope handle 20 further comprises a fluid handling device 90 in the form of a T-connector fluid fitting, as best seen in FIGS. 4b, 6b and 7a, which is formed separately from the frame 70. The fluid handling device is arranged substantially at the distal longitudinal end 74 of the frame 70. In other words, the control device 80 and the fluid handling device 90 are arranged at opposite longitudinal ends of the frame 70. As best seen in FIG. 7b, the fluid handling device comprises a fluid passage 91 having a first fluid opening 92 and further a second fluid opening 92', and a third fluid opening 92" as shown in FIGS. 6b and 7a. a proximal opening 35 of the working channel tube 34 is arranged in the first fluid opening 92 and is in fluid communication with the second fluid opening 92' and the third fluid opening 92".

The fluid handling device 90 is securely mounted onto the frame 70 via an interface in the form of a prismatic joint comprising a slot 93 and a pin 78 secured to the slot 93. In this embodiment, the slot 93 forms part of the fluid handling device 90 as shown in FIG. 6b and the pin 78 forms part of the frame 70 as shown in FIG. 6a but may in other embodiments be vice versa.

The pin 78 comprises a body 78b extending along a pin direction (through the plane of FIG. 7a) and a head 78a. As best seen in FIG. 6a, the body 78b is accommodated in the slot 93 and terminates in the head 78a, which secures the pin 78 to the slot 93 by preventing removal of the pin along the pin direction.

The slot 93 defines a pre-determined path extending along the longitudinal axis L between a proximal end position 93a of the slot 93, which is closest to the proximal longitudinal end 73 of the frame 70, and a distal end position 93b of the slot 93, which is farthest from the proximal longitudinal end 73 of the frame 70.

In the arrangement shown in FIGS. 4a-4b, i.e. prior to assembly with the shell parts 60, 60', the interface permits translational movement of the pin 78 in the slot 93 between the proximal end position 93a of the slot 93 and the distal end position 93b of the slot 93. The distance between the proximal end position 93a and the distal end position 93b is in the range of 0.2 mm to 2.5 mm, preferably around 1.25 mm, as this has been found to allow movement to absorb typical dimensional variation. However, the distance may be even less or more in some embodiments. Further, the working channel tube 34 is arranged with enough slack to allow movement of the fluid handling device 90 relative to the frame 70 via the interface.

As best seen in FIGS. 4b, 7a, and 7b, the frame 70 comprises a first tube guide passage 75 accommodating the working channel tube 34 and guiding the tube 34 towards the second longitudinal end 74 of the frame 70 (see FIG. 4b) and towards the first fluid opening 92 (see FIG. 7b). The fluid handling device 90 comprises a second tube guide passage 95 that accommodates the tube 34 and guides the tube 34 from the first fluid opening 92 and towards the first tube guide passage 75. The first tube guide passage 75 and the second tube guide passage 95 are separated by a gap 96, as best seen in FIGS. 7a-7b. The tube guide passages 75, 95 are formed as open channels having a channel bottom and two opposing channel walls and an open top side providing access to the channel. This allows the assembler to fit the tube 34 within the tube guide passages 75, 95 through the open top side.

The frame comprises two first engagement portions 76, 76' interlocking with two corresponding second engagement portions 66, 66' of the shell parts 60, 60', as best seen in FIG. 5b. The bearings 71, 71' also function as two further first engagement portions, and the collars 62, 62' also function as two further corresponding second engagement portions. The corresponding first and second engagement portions are configured, upon closure of the shell parts 60, 60', to engage and fix the frame 70 within the shell parts 60, 60'.

The shell parts 60, 61' comprise nine snap lock pairs. Each pair includes a male part 65a of one of the shell parts 60, 60' and a corresponding female part 65b of another one of the shell parts 60, 60'. The snap lock pairs are configured to be engaged upon closure of the shell parts 60, 60' to fix the shell parts to each other.

The endoscope handle 20 can be assembled as follows. The frame 70 including the mounted control device 80, fluid handling device 90, and end cap 27 is arranged in one of the shell parts 60, 60' and the other shell part is placed over to close the shell parts 60, 60'.

During the closure, the columns 61, 61' are arranged in the bearings 71, 71' of the frame 70 abutting the trunnions 85, 85' while allowing the control device 80 to pivot around the pivot axis P. The bearings 71, 71' of the frame 70 are arranged in collars 62, 62' so that the collars 62, 62' retain the bearings 71, 71'.

Furthermore, the alignment pairs are engaged so as to align the columns 61, 61' with respect to each other. In other words, the column axes C, C' are aligned towards coinciding. The corresponding first and second engagement portions engage and fix the frame 70 within the shell parts 60, 60'. A flange 99 of the fluid handling device 90 is arranged in a slit 69 of the first shell part 60', which fixes the fluid handling device 90 relative to the frame 70 (which are fixed via the engagement portions) so that the fluid handling device 90 is locked in a position within the pre-determined path in the range from the proximal end position 93a to the distal end position 93b. Accordingly, the fluid handling device 90 is adjusted to absorb tolerances of the frame 70 and shell parts 60, 60'.

Lastly, the male snap lock parts 65a are snap-locked onto the corresponding female snap lock parts 65b to secure the shell parts 60, 60' to each other so as to clamp the trunnions 85, 85' of the control device 80 between the columns 61, 61' of the shell parts 60, 60'. Accordingly, the trunnions 85, 85' are retained between the columns 61, 61'. Since the clamping force experienced by the trunnions 85, 85' substantially coincides with the pivot axis P, as seen in FIG. 5d, the pivoting of the control device about the pivot axis P is largely unaffected. The trunnions 85, 85' and the columns 61, 61' are supported by the bearings 71, 71' of the frame 70 so that the control device 80 is rotatable about the pivot axis P. Each trunnion 85, 85' extends partly through the respective bearing 71, 71' and mates with the respective column 61, 61' within the respective bearing 71, 71'. The first shell part 60 comprises a first collar 62, and the second shell part 60' comprises a second collar 62'. The collars 62, 62' each surround the respective column 61, 61' and retains the respective bearings 71, 71' of the frame 70, as best seen in FIG. 5d.

Once closed, the shell parts 60, 60' form an exterior surface 68 shaped to form an ergonomic grip for the operator. The exterior surface 68 is divided by a separation line 67 (as seen in FIGS. 5b and 5d) that extends in a single plane, which is perpendicular to the column axes C, C', as best seen in FIG. 5d. The separation line 67 defines the border between the shell parts 60, 60'. The shell parts 60, 60' enclose a cavity 63, which accommodates the frame 70 and the body 84 of the control device 80, while the control lever 81 extends radially relative to the pivot axis P through a first cut-out 68a of the exterior surface 68 of the shell parts 60, 60', as shown in FIGS. 3 and 5a.

Further, the fluid passage 91 of the fluid handling device 90 extends through the exterior surface 68. The second fluid opening 92' and the third fluid opening 92" of the fluid handling device 90 are arranged exteriorly of the exterior surface 68 and thus accessible for the operator. The first fluid opening 92 of the fluid handling device 90 is arranged within the cavity 63 and the fluid connection between the first fluid opening 92, and the working channel tube 34 is protected by the shell parts 60, 60'.

The following items are further variations and examples of the embodiments described above:

1. An endoscope handle for an endoscope for visually inspecting inaccessible places, such as human body cavities, the endoscope handle comprising: a frame (70) comprising bearings (71, 71'); a control device (80) comprising a body

(84) and trunnions (85, 85'), the trunnions extending from opposite sides of the body along a pivot axis (P), the control device being configured for steering a distal end (50) of the endoscope by pivoting about the pivot axis; and a first shell part (60) and a second shell part (60') together enclosing a cavity (63) accommodating the frame and at least partly the control device therein, the shell parts forming an exterior surface (68) shaped to form an ergonomic grip for an operator, and the shell parts comprising a first column (61) extending along a first column axis (C) and a second column (61') extending along a second column axis (C'), the first and second columns extend into the cavity from opposite sides, wherein the shell parts and the frame each are formed as separate components; wherein the trunnions of the control device and preferably the columns are supported by the bearings of the frame so that the control device is rotatable about the pivot axis, wherein the first and second columns of the shell parts are arranged to retain the trunnions of the control device between the first and second columns of the shell parts.

2. An endoscope handle according to any one of the previous items, wherein the frame and the bearings are formed as a single component, preferably formed in a single piece of a polymer material.

3. An endoscope handle according to any one of the previous items, wherein columns of the shell parts clamp the trunnions of the control device between the columns of the shell parts.

4. An endoscope handle according to any one of the previous items, wherein the trunnions of the control device are securely held in the bearings of the frame.

5. An endoscope handle according to any one of the previous items, wherein the frame comprises a first arm (72) and a second arm (72') extending substantially in parallel, the first arm comprising a first bearing (71) of the bearings, and the second arm comprises a second bearing (71') of the bearings, the arms are configured to, during arranging the trunnions in the bearings, flex away from each other to allow arrangement of the trunnions in the bearings, and to return to a resting position once the trunnions of the control device are arranged in bearings so as to secure the trunnions in the bearings.

6. An endoscope handle according to any one of the previous items, wherein the shell parts comprise one or more alignment pairs (64a, 64b) each including a first alignment part (64a) of one of the shell parts and a corresponding second alignment part (64b) of another of the shell parts, wherein the one or more of alignment pairs are engaged so as to centre the columns with respect to each other.

7. An endoscope handle according to any one of the previous items, wherein the control device comprises a control lever (81) extending radially relative to the pivot axis (P) through a cut-out (68a) of the exterior surface of the shell parts and having an exterior friction-inducing surface (83) for securely engaging with a finger of an operator so as to allow the operator to pivot the control device about the pivot axis.

8. An endoscope handle according to any one of the previous items, wherein the shell parts comprise a first collar (62) surrounding the first column and a second collar (62') surrounding the second column, wherein the collars are retaining the bearings of the frame.

9. An endoscope handle according to any one of the previous items, wherein the first shell part comprises the first column, and the second shell part comprises the second column.

10. An endoscope handle according to any one of the previous items, wherein a separation line (67) between the first shell part and the second shell part extends in a single plane being substantially perpendicular to the column axes.

11. An endoscope handle according to any one of the previous items, wherein the frame comprises one or more first engagement portions (76) each interlocking with a corresponding second engagement portion (66) of the shell parts.

12. An endoscope handle according to any one of the previous items, wherein the shell parts comprise one or more snap lock pairs (65a, 65b) each including a male part (65a) of one of the shell parts and a corresponding female part (65b) of another one of the shell parts, wherein the male snap lock parts are snap locked onto the corresponding female snap lock parts to secure the shell parts to each other so as to clamp the trunnions of the control device between the columns of the shell parts.

13. An endoscope for visually inspecting inaccessible places, the endoscope comprising: the endoscope handle (20) according to any one of the previous items, the endoscope handle being attached to the insertion tube opposite of the bending section; a distal tip part (50) including a vision device positioned in an interior cavity of the distal tip part; a bending section (40) including articulated hinges connected via hinges, the bending section being attached to the distal tip part; an insertion tube (30) for insertion into a patient and being attached to the bending section; and at least one steering wire (22) attached to the body of the control device of the endoscope handle and running through the bending section and the insertion tube so that manipulating the control device by an operator tensions the at least one steering wire (22) and effects bending of the bending section (40) so as to steer the distal end tip of the endoscope.

14. An endoscope system for visually inspecting inaccessible places, such as human body cavities, the endoscope system comprising a monitor (11) and an endoscope (1) comprising endoscope handle (20) according to any one of items 1-12 or an endoscope (1) according to item 13, wherein the endoscope is connectable to the monitor, and the monitor is configured for displaying an image captured by the vision device of the distal tip part.

15. A method of assembling an endoscope handle (20) according to any one of items 1-12, comprising the steps of: providing a frame (70) comprising bearings (71, 71'); providing a control device (80) comprising a body (84) and trunnions (85, 85'), the trunnions extending from opposite sides of the body along a pivot axis (P), the control device being configured for steering a distal end (50) of the endoscope by pivoting about the pivot axis; providing a first shell part (60) and a second shell part (61') configured for enclosing a cavity (63) and configured for forming an exterior surface (68) shaped to form an ergonomic grip for an operator, the shell parts comprising a first column (61) extending along a first column axis (C) and a second column (61') extending along a second column axis (C'), the first and second columns extend into the cavity (63) from opposite sides; arranging the trunnions of the control device and preferably the columns in the bearings of the frame so that the control device is rotatable about the pivot axis; arranging the frame with the control device in one of the shell parts; and closing the first shell part and the second shell part to enclose the cavity (63) and accommodating the frame and at least partly the control device therein so that the trunnions of the control device are retained between the columns of the shell parts.

LIST OF REFERENCES 1 endoscope
11 monitor
12 cable socket
13 monitor cable
20 handle
22 steering wire
23 wire tube
24 wire crimp
27 end cap
30 insertion tube
31 proximal end
32 distal end
34 working channel tube
35 proximal opening
40 bending section
50 distal tip part
53 data cable
60 shell part
61 column
62 collar
63 cavity
64a first alignment part
64b second alignment part
65a male snap lock part
65b female snap lock part
66 second engagement portion
67 separation line
68 exterior surface
68a cut out
69 slit
70 frame
71 bearing
72 arm
73 proximal longitudinal end
74 distal longitudinal end
75 first tube guide passage
76 first engagement portion
77 ramp
78 pin
78a pin head
78b pin body
80 control device
81 control lever
83 friction-inducing surface
84 body
85 trunnion
86 wire loop portion
90 fluid handling device
91 fluid passage
92 fluid opening
93 slot
93a proximal end position
93b distal end position
93c distance
95 second tube guide passage
96 gap
99 flange
P pivot axis
C column axis
L longitudinal axis

We claim:
1. An endoscope comprising:
a handle including:
  a frame comprising a frame body, a first arm, a second arm, and bearings including a first bearing and a second bearing, the first arm and the second arm each comprising a distal end connected to the frame body, a middle portion, and a proximal end extending proximally from the middle portion, the proximal end of the first arm including the first bearing, the proximal end of the second arm including the second bearing, the frame body being devoid of structure connecting the proximal end and the middle portion of the first arm to the proximal end and the middle portion of the second arm to thereby enable the proximal end of the first arm and the proximal end of the second arm to separate from each other upon application of a spreading force and to return to a resting position upon removal of said spreading force;
  a control device comprising a body and trunnions, the trunnions extending from opposite sides of the body along a pivot axis, the control device being configured for steering a distal end of the endoscope by pivoting about the pivot axis; and
  shell parts including a first shell part and a second shell part together enclosing a cavity accommodating the frame and at least partly the control device therein, the shell parts forming an exterior surface and comprising columns, the columns comprising a first column extending along a first column axis and a second column extending along a second column axis, the first column and the second column extending into the cavity from opposite sides thereof,
wherein the shell parts and the frame each are formed as separate components;
wherein the trunnions of the control device are supported by the bearings of the frame so that the control device is rotatable about the pivot axis,
wherein the columns of the shell parts are arranged to retain the trunnions of the control device between the first column and the second column of the shell parts, and
wherein the trunnions are configured to provide the spreading force to spread apart the bearings and thus allow arrangement of the trunnions in the bearings.

2. The endoscope of claim 1, wherein the frame and the bearings are formed as a single component formed in a single piece of a polymer material.

3. The endoscope of claim 1, wherein the columns of the shell parts clamp the trunnions of the control device between the columns of the shell parts.

4. The endoscope of claim 1, wherein the trunnions of the control device are securely held in the bearings of the frame.

5. The endoscope of claim 1, wherein the first arm and the second arm extend substantially in parallel.

6. The endoscope of claim 1, wherein the shell parts comprise one or more alignment pairs each including a first alignment part of one of the shell parts and a corresponding second alignment part of another of the shell parts, wherein the one or more of alignment pairs are engaged so as to center the columns with respect to each other.

7. The endoscope of claim 6, wherein the shell parts comprise a first collar surrounding the first column and a second collar surrounding the second column, wherein the collars retain the bearings of the frame.

8. The endoscope of claim 7, wherein the first shell part comprises the first column, and the second shell part comprises the second column.

9. The endoscope of claim 7, wherein a separation line between the first shell part and the second shell part extends in a single plane being substantially perpendicular to the column axes.

10. The endoscope of claim 7, wherein the frame comprises one or more first engagement portions each interlocking with a corresponding second engagement portion of the shell parts.

11. The endoscope of claim 7, wherein the shell parts comprise one or more snap lock pairs each including a male part of one of the shell parts and a corresponding female part of another one of the shell parts, wherein the male snap lock parts are snap locked onto the corresponding female snap lock parts to secure the shell parts to each other so as to clamp the trunnions of the control device between the columns of the shell parts.

12. The endoscope of claim 1, wherein the control device comprises a control lever extending radially relative to the pivot axis through a cut-out of the exterior surface of the shell parts and having an exterior friction-inducing surface for securely engaging with a finger of an operator so as to allow the operator to pivot the control device about the pivot axis.

13. The endoscope of claim 1, wherein the shell parts comprise a first collar surrounding the first column and a second collar surrounding the second column, wherein the collars retain the bearings of the frame.

14. The endoscope of claim 1, wherein the first shell part comprises the first column, and the second shell part comprises the second column.

15. The endoscope of claim 1, wherein a separation line between the first shell part and the second shell part extends in a single plane being substantially perpendicular to the column axes.

16. The endoscope of claim 1, wherein the frame comprises one or more first engagement portions each interlocking with a corresponding second engagement portion of the shell parts.

17. The endoscope of claim 1, wherein the shell parts comprise one or more snap lock pairs each including a male part of one of the shell parts and a corresponding female part of another one of the shell parts, wherein the male snap lock parts are snap locked onto the corresponding female snap lock parts to secure the shell parts to each other so as to clamp the trunnions of the control device between the columns of the shell parts.

18. The endoscope of claim 1, further comprising:
an insertion tube;
a bending section attached to the insertion tube, the handle being attached to the insertion tube opposite of the bending section;
a distal tip part including a vision device positioned in an interior cavity of the distal tip part, the bending section being attached to the distal tip part; and
at least one steering wire attached to the body of the control device of the handle and running through the bending section and the insertion tube so that manipulating the control device by an operator tensions the at least one steering wire and effects bending of the bending section so as to steer the distal end tip of the endoscope.

19. An endoscope system comprising:
a monitor; and
an endoscope according to claim 1, the endoscope further comprising a vision device located at a distal end of the endoscope,
wherein the endoscope is connectable to the monitor, and
wherein the monitor is configured for displaying an image captured by the vision device.

20. A method of assembling the endoscope of claim 1, the method comprising:
providing the frame comprising the bearings;
providing the control device, and
providing the shell parts including the first shell part and the second shell part;
arranging the trunnions of the control device and the columns in the bearings of the frame so that the control device is rotatable about the pivot axis;
arranging the frame with the control device in one of the shell parts; and
closing the first shell part and the second shell part to enclose the cavity and form a handle, the handle accommodating the frame and at least partly the control device so that the trunnions of the control device are retained between the columns of the shell parts.

21. The endoscope of claim 1, wherein the proximal end of the first arm includes a guide ramp leading to the first bearing and including an entry, wherein the proximal end of the second arm includes a guide ramp leading to the second bearing and including an entry, and wherein a distance between the entry of the guide ramp of the first arm and the entry of the guide ramp of the second arm is greater than an axial distance between respective ends of the trunnions.

* * * * *